(No Model.) 2 Sheets—Sheet 1.
W. A. ROGERS.
APPARATUS FOR DETERMINING MINUTE MEASUREMENTS.
No. 449,175. Patented Mar. 31, 1891.
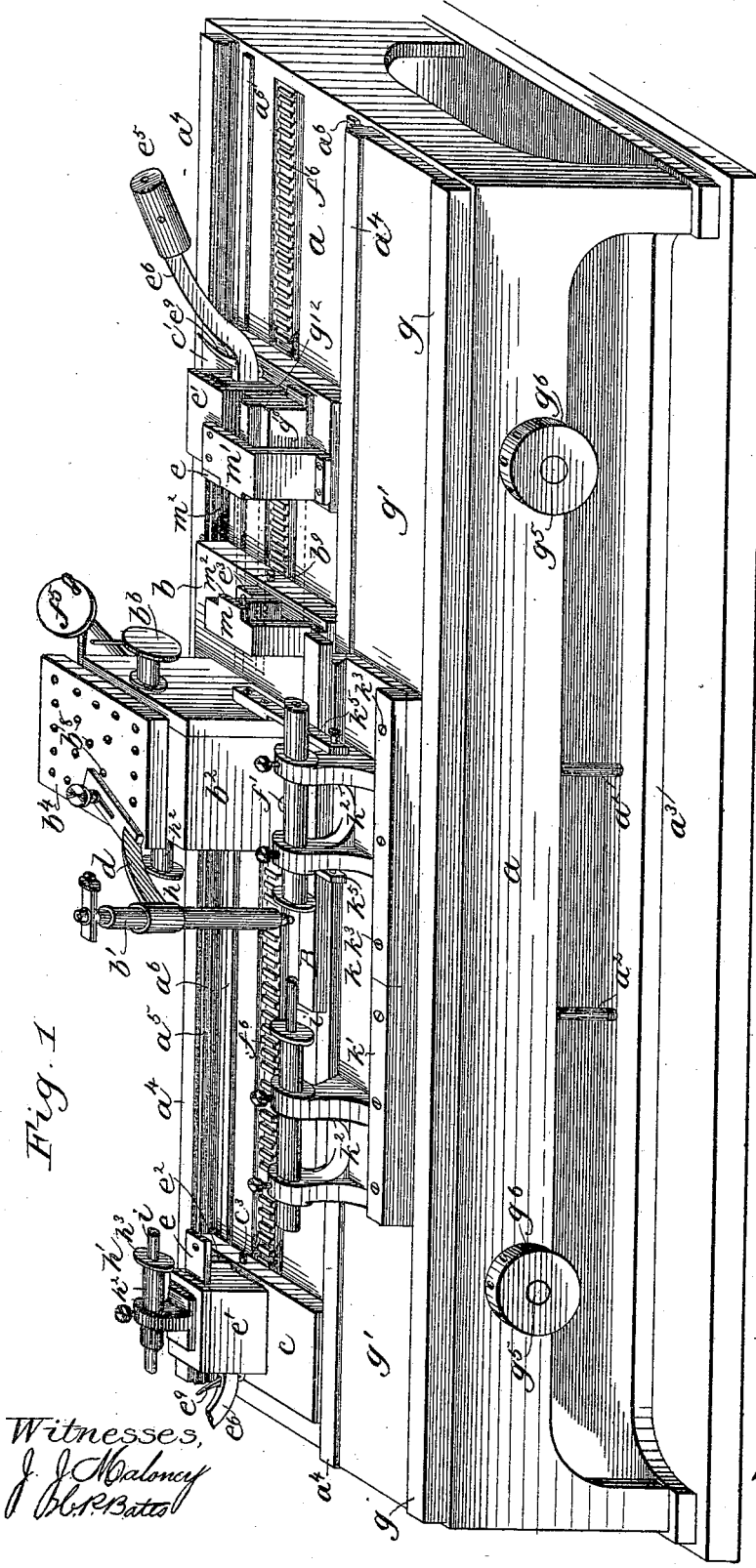

(No Model.) 2 Sheets—Sheet 2.
W. A. ROGERS.
APPARATUS FOR DETERMINING MINUTE MEASUREMENTS.
No. 449,175. Patented Mar. 31, 1891.
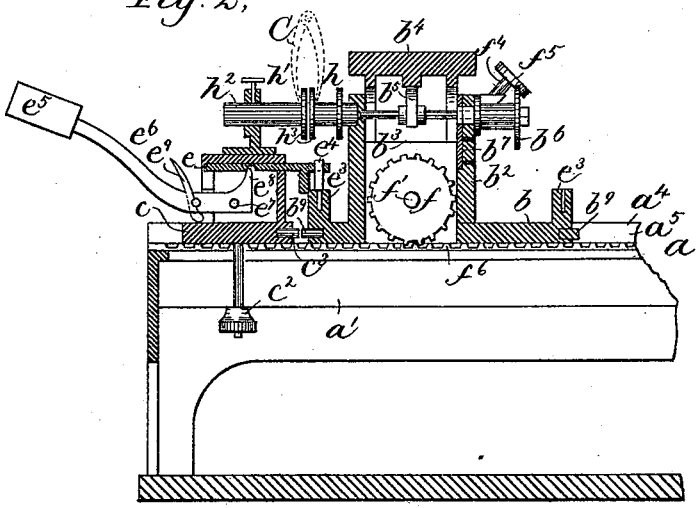
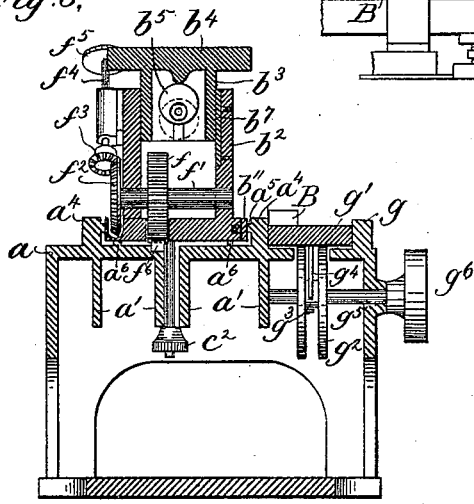
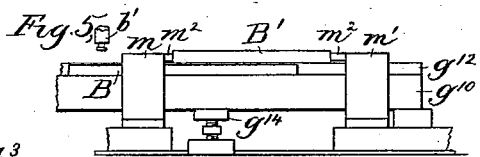
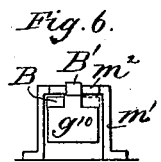
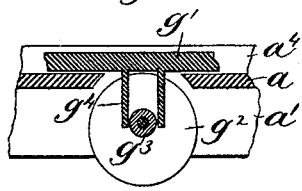
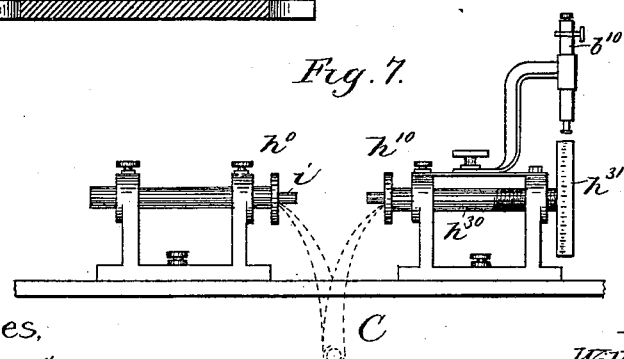
Witnesses,
J. J. Maloney.
W. R. Bates.
Inventor,
William A. Rogers,
by Jos. P. Livermore
Atty.

UNITED STATES PATENT OFFICE.

WILLIAM A. ROGERS, OF CAMBRIDGE, MASSACHUSETTS.

APPARATUS FOR DETERMINING MINUTE MEASUREMENTS.

SPECIFICATION forming part of Letters Patent No. 449,175, dated March 31, 1891.

Application filed January 25, 1886. Serial No. 189,684. (No model.)

*To all whom it may concern:*

Be it known that I, WILLIAM A. ROGERS, of Cambridge, county of Middlesex, State of Massachusetts, have invented an Improvement in Apparatus for Determining Minute Measurements, of which the following description, in connection with the accompanying drawings, is a specification, like letters on the drawings representing like parts.

The object of my invention is to provide improved facilities for determining minute measures in mechanical operations with an extreme degree of precision.

At the present day a machine-shop having facilities for producing fine work is usually provided with a set of gages which give standards of length usually by aliquot parts of an inch or other unit of linear measure with great precision; but such a set of gages is very expensive and does not give the intermediate measures between two successive sizes of the gages. The gages themselves have usually been tested and brought to standard size with an extreme degree of accuracy by a measuring-instrument commonly known as a "comparator," by means of which each gage in the process of manufacture is compared microscopically with a single standard of linear measure consisting of a bar having the divisions of the linear units engraved on a surface that can be observed by a microscope, and one bar is preserved for an indefinite period of time at the place where the gages are made, so that all gages made in an indefinite period of time are compared with the one permanent standard of linear measure. The comparators themselves as heretofore made have not been adapted for use in a workshop, so that in reality the workshop takes its measures indirectly through the intervention of a series of gages from a comparator and standard-bar at the place where the gages were originally made.

My invention involves the use of an instrument resembling in its nature and operation a comparator, but embodying in its construction additional elements which enable it to be used as a gage or caliper, from which measurements may be taken directly for use in mechanical operations, and the measurements used in the workshop instead of being referred through the intervention of a series of gages to a standard graduated bar at some other place where the gages were originally made, refer directly to a standard-bar through gaging-instruments, and as a consequence measurements representing any fraction or multiple of the unit of measure may be taken with equal facility and accuracy to those, comparatively few in number, which are usually represented by the different gages of a series. The apparatus may also be used as a comparator, but is simpler in construction and far less expensive than the comparators heretofore commonly made, and is thus brought within the means of an ordinary workshop, being but little if any more expensive than a set of gages such as now generally used, but more convenient and having a far wider range of application.

The apparatus comprises a bed having ways which are ground and finished with accuracy, and a microscope-carriage having a sliding rectilinear movement on the said ways, and provided with a microscope-stand which is vertically adjustable in the said carriage, the parts being made to secure rigidity between the microscope and the ways, so that the microscope and the axis or line of vision determined by it will have a rectilinear movement parallel with the ways.

The apparatus also contains stops for arresting the movement of the microscope-carriage, which may themselves be fixed at any desired position on the ways, so as to limit the movement of the carriage to any desired amount, and the said stops are provided with devices, which may be called "gravity-locks," by which the contact-points of the carriage and stop will be brought into engagement with one another without shock and with a pressure which will be uniform at each engagement. One or both of the stops and the microscope-carriage are provided with what may be called "caliper-stops," which consist, essentially, of disks or flat plates having their surfaces carefully ground to a plane at right angles to the line of movement of the microscope-carriage, the said plates being formed at the ends of shanks and having both their front and rear faces plane and at definite distance apart, preferably a quarter of an inch apart, so that when the stops have their front faces in contact their rear faces will be exactly one-half an inch apart, and after the caliper-stops have been placed in contact by the movement of the microscope-carriage they can be placed at any desired distance apart by moving the microscope-carriage over that distance and referring its movement to a standard graduated bar. If an outside measure is desired and it is greater than one-half an inch, the carriage may be moved the desired distance less one-half an inch, and the outside faces of the caliper-stops will be the desired distance apart, and the measurement may be taken from them by ordinary hand-calipers, just as it would be taken from the end-measure gages now commonly in use; or, if an outside caliper is desired, the microscope-carriage may be moved the desired distance and the measurements taken from the opposite inner faces of the stops. The intention is that in a workshop provided with apparatus of this kind an operator familiar with the use of the instrument shall set ordinary calipers for any measurement which may be desired by any workman, thus dealing out, as it were, accurate measurements for use in the shop. As the change of position of the stops for any new measurement will practically destroy for the time being the previous measurement, and as it may be desirable in some cases to retain a given measurement for a considerable length of time, the apparatus is also provided with one or more detachable pairs of caliper-stops, which may be placed upon the bed of the main apparatus in such manner that one of the stops will remain stationary, while the other will accompany the microscope-carriage, and may consequently be set at any desired distance from the stationary one and then clamped or fixed, when the pair of stops may be removed from the main apparatus and will constitute a practically-permanent gage for the position at which the stops were set; and by having a considerable number of such detachable pairs a number of gages may be produced at any time, affording the same convenience as the end-measure gages now in use, but with the great advantage that each one of them is capable of being set for any length that may be desired, while the end-measure gages can represent only one length and are unavailable for any other length.

The caliper-stops, having plane front and rear faces and cylindrical supporting-shanks, may be used in other instruments for measuring besides those in which a rectilinear movement of the microscope is referred directly to a graduated bar or standard of linear measure, and such a modification is shown in which the movable stop is carried by a micrometer-screw.

The invention also consists in means for supporting line and end-measure bars in position to co-operate with engaging stop-projections, by which the apparatus may itself be tested for the purpose of ascertaining whether or not the microscope carriage and microscope move in a rectilinear path, and whether the plane of the faces of the stops is at right angles to the said path, so that any inaccuracies in the machine as first constructed may be removed and the error reduced to a minimum.

Figure 1 is a perspective view of an apparatus for providing minute measurements in accordance with this invention; Fig. 2, a partial longitudinal section through the microscope-carriage and one of the stops for the said carriage; Fig. 3, a transverse vertical section; Fig. 4, a sectional detail to be referred to; Figs. 5 and 6, side and end elevations of the stops employed for testing the apparatus, showing their mode of operation; and Fig. 7, a modification showing the caliper-stops employed in connection with a microscopic micrometer-gage.

The main bed $a$ of the machine may be of any suitable size and material, preferably cast-iron having deep longitudinal ribs $a'$ (see Fig. 3) to give it great stiffness, and, if need be, intermediate supports $a^2$, (see Fig. 1,) adjustably connected with a base-plate $a^3$ for the purpose of neutralizing flexure produced by gravity. The said bed is provided with upwardly-projecting ribs $a^4$, having lateral projections $a^5$, which, with projections $a^6$ between them on the bed, constitute ways on which the microscope-carriage $b$ and the stops $c\ c'$ therefor move, the said ways being ground and finished to give as near as possible an exact rectilinear movement, and the carriage having a spring-pressed bearing-plate $b''$, (see Fig. 3,) by which it is held in contact with one of the lateral ways without lost motion. The projections or ridges $a^5\ a^6$ constitute what is known as "chipping-pieces," affording an opportunity for an exceedingly accurate finish.

The microscope-carriage $b$ is provided with a hollow upright or turret $b^2$, into which is fitted the shank or foot $b^3$ of the microscope-supporting platform $b^4$, which rests upon and is vertically adjustable by an eccentric or cam $b^5$ (see Figs. 2 and 3) on a shaft having a handle or disk $b^6$, by which it may be turned to raise and lower the platform $b^4$. Separate bearing-plates $b^7$ are provided on two sides of the shank $b^3$ of the microscope-platform to take up the wear and insure absolute rigidity of the platform against horizontal movement with relation to the remainder of the carriage and to the ways on the bed of the apparatus. The microscope-platform $b^4$ is provided with a number of screw-sockets $b^8$, by means of which a microscope-clamp $d$ may be rigidly fastened in any desired position on the said platform, holding the microscope $b'$ in proper position to move over while focused on the face of a graduated bar B, which may be supported upon the bed at the side of the said carriage.

The stops $c\ c'$ consist, essentially, of platforms which are also movable on the ways $a^5$ $a^6$, and may be rigidly fastened at any desired position thereon by a clamping device $c^2$. (Shown in Fig. 2.) The said platforms are shown as provided with contact or engaging pieces $c^3$, which engage corresponding contact-pieces $b^9$ on the microscope-carriage, thus limiting the movement of the said carriage and determining the distance between the extreme positions of the microscope as the carriage is moved back and forth between the said stops, which distance will remain the same as long as the stops remained fastened in any given position.

In order to prevent undue impact or shock in the engagement of the contacts $c^3 b^9$ and to insure uniform pressure between the said points at each engagement, the stops $c\ c'$ are each provided with a gravity-lock consisting of a slide-bar $e$, moving in an upright $e'$ on the stop-platform, and provided with a finger $e^2$, projecting into the path of a projection $e^3$ on the microscope-carriage, so that the projections $e^2$ and $e^3$ arrest the movement of the carriage, as shown in Fig. 2, before the contact-points $c^3 b^9$ come into engagement with one another, thus warning the operator that the carriage has arrived nearly at the stop. The slide-bar $e$ may then be connected with the microscope-carriage by any suitable fastening device, shown in this instance as a pin $e^4$ (see Fig. 2) passing through an opening in the slide-bar and into an opening in the projection $e^3$ on the microscope-carriage. When thus connected, the slide-bar and carriage are moved in the direction to bring the contact-points $c^3 b^9$ together by a weight $e^5$, shown as mounted on a lever $e^6$, pivoted at $e^7$ in the upright $e'$, and having its short arm $e^8$ engaged with the slide-bar $e$, so that the downward movement of the weight $e^5$ produces a slight movement of the bar $e$. The weight $e^5$ is held in its upper position by a latch $e^9$ (best shown in Fig. 2) until the operator has connected the slide bar and microscope-carriage, when the latch $e^9$ is disengaged and the weight $e^5$ permitted to descend under the action of gravity, when it will move the microscope-carriage slowly until the contact-points $c^3 b^9$ are brought into engagement with a pressure derived from the said weight, which is just sufficient in amount to overcome the friction of the carriage and move the same without material acceleration through the short space between the contact-points $c^3 b^9$ when in the position shown in Fig. 2. The microscope-carriage may be pushed bodily along the ways until engaged by the gravity-stops; but to facilitate its movement and steady the same when required it is provided with feed mechanism consisting, essentially, of a gear $f$, contained in the upright $b^2$ and fastened upon a shaft $f'$, provided with a beveled gear $f^2$ at the outside of the turret meshing with a bevel-pinion $f^3$ on an inclined shaft $f^4$, provided with a hand-wheel $f^5$, which, when rotated by the operator, will cause the gear $f$ to turn, and by its engagement with a rack $f^6$ on the bed $a$ will cause the carriage to move on its ways.

The apparatus thus far described may be used as a comparator for comparing standards of linear measure with one another in various ways—such, for instance, as by making the movement of the microscope determined by the stops equal to one bar or standard and then substituting another in place of the one previously observed and noting the deviation of the second from the distance traversed by the microscope, which will also be the deviation from the standard first observed. The present invention does not, however, include, broadly, a comparator capable of operation in this manner; but it is believed that the features in the construction of the microscope-carriage, stops, and gravity-locks already specified are novel.

The bed $a$ is provided with another upright projection $g$, which, together with the one $a^4$ at one side of the carriage-ways, forms a guide or holder for a platform $g'$, supported near each end of the bed upon the eccentrics $g^2$, (see Figs. 3 and 4,) having a concentric hub $g^3$, engaged by pins $g^4$ from the platform $g'$, to prevent endwise movement of the said platform, the said eccentrics being mounted upon shafts $g^5$, provided with suitable hand-wheels or disks $g^6$, at the front of the apparatus, by which they may be turned to adjust the platform $g'$ vertically. The said platform $g'$ is used to support the bars that are to be observed by the microscope $d'$, and by setting the microscope first over one of the eccentrics $g^2$ the corresponding portion of the bar resting on the platform $g'$ may be brought into focus by turning the said eccentric and adjusting the platform vertically at that point, and then by moving the microscope-carriage any convenient distance toward the other eccentric another point on the bar may be brought in focus by means of the other eccentric without changing the vertical position of the part previously focused. The bar is thus readily brought into a horizontal plane parallel with the line of movement of the microscope, and it may be made parallel with the said line in the said plane by placing it in contact with one of the projections $g$ or $a^4$, as shown at B, Fig. 3.

In order to use the apparatus as a caliper-gage for providing accurate measurements in workshops, the microscope-carriage and one of the stops $c$ or $c'$ may be provided with caliper-stops $h\ h'$, each comprising a cylindrical shank $h^2$, and a plate or disk $h^3$ at the end of the said shank, having its opposite faces each ground accurately to a plane at right angles with the line of movement of the microscope-carriage and at a known distance apart, preferably some convenient fraction of the linear unit—as, for instance, a quarter of an inch. Then if a workman desires a gage .512 of an inch the microscope-carriage is first moved until the stops $h\ h'$ are brought in contact, employing the gravity-lock or not, as preferred, and an observation is made through the microscope of a graduated standard of linear measure, as B, supported directly or indirectly on the platform $g'$, and previously brought into focus and parallelism with the line of movement of the microscope. Then the carriage is moved away from the stationary stop $h$ the desired distance—namely, .512 of an inch, determined by observing the graduations on the bar B in connection with the micrometer eye-piece of the microscope, and the desired measurement may be taken off by ordinary calipers from between the opposite faces of the stops $h\,h'$. If an inside measurement were desired, the microscope carriage and stop $h'$ might have been moved .012 of an inch (the difference between the desired amount and the total thickness of the disks of the stops) and the measurement taken off from the outer or rear surface of the stop-disks, resting the calipers against the cylindrical shanks in order to insure the contact of the calipers in a line parallel with the line of movement of the stops, or in other words the shortest distance between the said faces.

The caliper-stops and their shanks are also shown in Fig. 1 as bored longitudinally to receive a bearing-piece $i$, upon which calipers may be rested when measuring between the inner faces of the stops.

In some cases it may be desirable to set a pair of caliper-stops like the ones $h\,h'$ at certain distances apart and retain them thus placed for a considerable period of time. If the caliper-stops were connected with the microscope-carriage and stop $c$, as shown, this would prevent the use of the apparatus for other measurements as long as the stops remain thus set. In order to provide for the permanent setting of the stops without interfering with the subsequent use of the apparatus, the said stops may be placed on a supplementary or removable bed $k$, having guides $k'$, between which the stop-carriages $k^2$ may move, the said bed $k$ fitting upon the plate $g'$ and being retained by the ledges $g\,a^4$ parallel with the ways on which the microscope-carriage $b$ travels. One of the guides $k'$ for the stop-carriages $k^2$ is divided into two parts, as shown, the said parts being provided with clamping-screws $k^3$, which may be loosened to permit the carriages $k^2$ to move, or may be tightened to fasten the said carriages in any desired position on the bed $k$. In operation one of the stop-carriages is thus fastened and the other one made free to move on the bed $k$, and connected with the microscope-carriage, as by arms $k^5$, so as to accompany the said carriage in its movement, so that the movement of the said stop-carriage from the position in which the stop-faces are in contact may be referred to the standard-bar B in exactly the same way as the caliper-stops $h\,h'$, before described.

When the stop-carriage $k'$ has been moved the desired distance from the stationary one, it is made fast on the bed $k$, which, together with the stops, may be removed from the main bed of the machine, which may then be used for making other measurements, while the stops on the supplemental bed will remain as a standard for the measure at which they were set for an indefinite period of time. Any desired number of the supplemental beds and stops may be employed, each set at any desired measurement.

If the way $a^5$, against which the base of the microscope-carriage $b$ is pressed, has any curvature in the horizontal plane, the different points on the microscope-carriage, or on other parts connected to move with it at different distances from the said guide $a^5$, will move in arcs of different radii, and consequently will move through different distances in the movement of the microscope-carriage; and if the stop-faces were at considerably greater or less distance from the guideway $a^5$ than the axis of the microscope and the standard bar observed by it, this difference in the distance traversed by the stop which moves with the microscope-carriage and the axis of the microscope might become appreciable; and in order to obviate the necessity of determining the amount of curvature of the ways and making corrections therefor, the contacting-faces of the stops and the line of graduations of the standard-bar and axis of the microscope may all be in substantially the same vertical plane or at the same horizontal distance from the guideway $a^5$. To accomplish this result, the stops may be constructed as shown at $m\,m'$ in Figs. 1, 5, and 6, having their contacting-faces $m^2$ on a bridge or arm connected with the platform of the microscope-carriage, and the platform of one of the stop-carriages, so that a supporting-bar $g^{10}$ (shown mainly in dotted lines, Fig. 1) may be placed with its upper surface just beneath the said contacting-surfaces of the stops, so that the latter may move freely with relation to the said bar, without, however, actually touching it. The said bar $g^{10}$ has its upper surface grooved or rabbeted, as shown at $g^{12}$, to receive the standard graduated bar B, the upper surface of which is preferably just about flush with the upper surface of the supporting-bar, as shown, and consequently just below the contacting-surfaces of the stops $m\,m'$, which need not be more than a quarter of an inch wide, measured in a vertical direction, so that the microscope, when focused on the surface of the bar, can pass above them. The supporting-bar $g^{10}$ may be sustained at as many points as required upon adjustable supports $g^{14}$, which may be placed at any desired point beneath the bar on the bed of the apparatus and then adjusted to neutralize flexure of the bar produced by gravitation.

The devices just described may also be employed for testing the correctness of the apparatus in its various parts. For this purpose the supporting-bar $g^{10}$ is preferably rabbeted at both sides of its middle, as best shown in Fig. 6, and in order to test for horizontal curvature of the ways on which the microscope-carriage travels the apparatus may be used as shown in Figs. 5 and 6.

An end-measure bar B' or any object which need not necessarily be of any particular unit of length, may be placed on the middle projecting part of the bar $g^{10}$, as shown, and its length measured by two observations on the bar B, when placed in the rabbet at one side of the bar $g^{10}$, these observations being made, first, when the stops $m^2$ are in contact with one another, and, second, when both are in contact with the bar B', as shown in Fig. 5, and the difference between the readings from the bar B being the length of the bar B' if the movement of the microscope is rectilinear. The same measurement is then made with the bar B placed in the rabbet at the other side of the bar $g^{10}$, and if the measurement of the bar B' thus determined is the same as before it will show that the movement of the microscope is rectilinear; but if not it will show that the guides of the microscope-carriage have some curvature, which can then be eliminated. In a similar manner two different measurements may be taken of an end-measure bar, as B', so supported as to come between the parts of the stops $m^2$, first above the rabbet at one side of the bar $g^{10}$ and then at the other side, these measurements both being referred to a line-bar, which remains in the same position, and if they agree they will show that the faces of the contact portions $m^2$ of the stops are parallel, and if they do not agree they will show the error in the faces of the said stops, which error may be eliminated by proper grinding.

It is obvious that the apparatus is equally well adapted for determining the actual dimensions of a piece or part of a machine already constructed, so that the exact dimensions of all parts of a machine may be determined and recorded, so that they may be subsequently used, if required, to reproduce any given part of the machine, thus obviating the necessity of constructing and preserving a number of end-measure gages, as is sometimes practiced where but a single machine of a certain kind is built and the builder may be subsequently called upon to reproduce a certain part which shall be capable of replacing or being interchanged with the original part.

Fig. 7 shows the caliper-stops $h^\circ$ $h^{10}$, constructed as before described, in an apparatus in which one of the stops, as $h^{10}$, has a micrometer movement, its shank $h^{30}$ being threaded so that its rotation produces a proportional longitudinal movement. The said shank is provided with a graduated disk $h^{31}$, having its graduations in position to be observed by a microscope $b^{10}$. This figure also illustrates the method of taking an inside measurement by calipers C, (shown in dotted lines,) while Fig. 2 represents the operation of taking an outside measurement. The caliper-stops are shown in all cases as located between the ways which guide them in their movement, a position most favorable for reducing the error arising from curvature of said ways to a minimum.

I claim—

1. In an apparatus for determining linear measures, a bed provided with parallel longitudinal ribs having ridges projecting toward one another and ridges projecting upward from the bed between the said ribs, combined with a microscope-carriage having a base or platform resting on said upright ridges and fitted between the lateral ridges and normally pressed against one of the latter, a caliper-stop connected with said carriage and having a plane surface at right angles to its line of movement, and a corresponding stop and support therefor fastened upon said bed, substantially as described.

2. In an apparatus for determining linear measures, a bed provided with ways and stops fixed with relation to said bed, and a microscope movable with relation to the said bed and having its movement toward the said stop limited by engagement therewith, combined with a gravity-lock, by which the microscope-carriage is drawn toward the stop and held in engagement therewith, with a definite pressure derived from the force of gravity, substantially as described.

3. In an apparatus for providing standards of linear measure, a co-operating pair of caliper-stops, one movable with relation to the other and each composed of a plate having front and rear plane faces at right angles to the line of movement of one stop from the other, and means for referring the movement of one stop relative to the other to a graduated-line-measure bar, substantially as described.

4. The caliper-stops consisting of shanks and flanges at the ends thereof, each having plane front and rear faces at right angles to the axis of the shank, and the said shanks being of equal size and shape in cross-section and constituting the rest for the jaws of the calipers spanning the distance between the rear faces of the flanges, substantially as described.

5. The combination of a pair of stops having plane contact-surfaces, with the supporting-bar immediately below the said surfaces rabbeted or recessed to receive a line-measure bar and support the same with its graduated surface immediately below the contacting faces of the stops, substantially as described.

6. An apparatus for providing standards of linear measure, comprising a bed and ways or guides, and the microscope-carriage having a linear movement on the said ways, combined with a supplementary bed having stop-carriages longitudinally movable therein, and means to clamp or fasten each of the said carriages, and connections between one of the said stop-carriages and the microscope-carriage, whereby the said stop-carriage accompanies the microscope-carriage in its rectilinear movement, which is referred by the microscope to a standard of linear measure, substantially as described.

7. The combination of the bed and ways or guides thereon with the microscope-carriage movable on said ways and provided with a hollow upright, and the microscope-supporting platform provided with a foot fitted and vertically adjustable in the upright of the said carriage, substantially as described.

8. The combination of a pair of stops each having a plane surface and a rectilinear guideway, on which one or both of said stops are movable one with relation to the other, and supports for said stops located at the sides of their path of movement, whereby a space is afforded immediately below the said stops for a line-measure bar along the surface of which the said stops are free to move, substantially as and for the purpose described.

9. The combination of the bed and ways with the microscope-carriage movable on said ways and provided with a hollow upright, and a microscope-supporting platform having a foot fitted in said upright, and the adjusting device for raising and lowering the said microscope-platform, substantially as described.

In testimony whereof I have signed my name to this specification in the presence of two subscribing witnesses.

WILLIAM A. ROGERS.

Witnesses:
   JOS. P. LIVERMORE,
   H. R. BATES.